United States Patent
Eykholt et al.

(10) Patent No.: US 12,288,154 B2
(45) Date of Patent: Apr. 29, 2025

(54) ADAPTIVE ROBUSTNESS CERTIFICATION AGAINST ADVERSARIAL EXAMPLES

(71) Applicant: International Business Machines Corporation, Armonk, NY (US)

(72) Inventors: Kevin Eykholt, White Plains, NY (US); Taesung Lee, Ridgefield, CT (US); Jiyong Jang, Chappaqua, NY (US); Shiqi Wang, Brooklyn, NY (US); Ian Michael Molloy, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 17/113,927

(22) Filed: Dec. 7, 2020

(65) Prior Publication Data

US 2022/0180172 A1    Jun. 9, 2022

(51) Int. Cl.
*G06N 3/047* (2023.01)
*G06F 18/214* (2023.01)
(Continued)

(52) U.S. Cl.
CPC .............. *G06N 3/08* (2013.01); *G06F 18/214* (2023.01); *G06F 18/22* (2023.01); *G06F 18/231* (2023.01);
(Continued)

(58) Field of Classification Search
CPC .... G06N 3/08; G06N 3/063; G06F 18/24323; G06F 18/22; G06F 18/231; G06F 18/214
See application file for complete search history.

(56) References Cited

U.S. PATENT DOCUMENTS 10,311,442 B1    6/2019    Lancaster
10,489,707 B2 *  11/2019   Hillar ................ G06F 16/24578
(Continued)

OTHER PUBLICATIONS

Zhang et al., "Efficient Neural Network Robustness Certification with General Activation Functions," arXiv:1811.00866 [cs.LG], NIPS 2018.
(Continued)

*Primary Examiner* — Mahelet Shiberou
(74) *Attorney, Agent, or Firm* — Jordan T. Schiller

(57) ABSTRACT

Adaptive verifiable training enables the creation of machine learning models robust with respect to multiple robustness criteria. In general, such training exploits inherent inter-class similarities within input data and enforces multiple robustness criteria based on this information. In particular, the approach exploits pairwise class similarity and improves the performance of a robust model by relaxing robustness constraints for similar classes and increasing robustness constraints for dissimilar classes. Between similar classes, looser robustness criteria (i.e., smaller ∈) are enforced so as to minimize possible overlap when estimating the robustness region during verification. Between dissimilar classes, stricter robustness regions (i.e., larger ∈) are enforced. If pairwise class relationships are not available initially, preferably they are generated by receiving a pre-trained classifier and then applying a clustering algorithm (e.g., agglomerative clustering) to generate them. Once pre-defined or computed pairwise relationships are available, several grouping methods are provided to create classifiers for multiple robustness criteria.

29 Claims, 8 Drawing Sheets

(51) Int. Cl.
  *G06F 18/22* (2023.01)
  *G06F 18/231* (2023.01)
  *G06F 18/243* (2023.01)
  *G06N 3/045* (2023.01)
  *G06N 3/063* (2023.01)
  *G06N 3/08* (2023.01)

(52) U.S. Cl.
  CPC ....... *G06F 18/24323* (2023.01); *G06N 3/063* (2013.01)

(56) References Cited

U.S. PATENT DOCUMENTS

| | | | | |
|---|---|---|---|---|
| 11,410,073 | B1* | 8/2022 | Narsky | G06N 20/00 |
| 2011/0289025 | A1* | 11/2011 | Yan | G06N 5/025 |
| | | | | 706/47 |
| 2015/0169952 | A1* | 6/2015 | O'Malley | G06F 18/28 |
| | | | | 382/225 |
| 2017/0236000 | A1* | 8/2017 | Hwang | G06F 18/2411 |
| | | | | 382/103 |
| 2020/0097742 | A1* | 3/2020 | Ratnesh Kumar | G06N 3/045 |
| 2020/0242252 | A1 | 7/2020 | Chen et al. | |
| 2021/0279505 | A1* | 9/2021 | Zhong | G07G 1/0063 |
| 2021/0357750 | A1* | 11/2021 | Mummadi | G06F 18/251 |
| 2023/0259707 | A1* | 8/2023 | Joshi | G06N 20/00 |
| | | | | 704/9 |

OTHER PUBLICATIONS

Lee, et al., "Tight Certificates of Adversarial Robustness for Randomly Smoothed Classifiers," arXiv:1906.04948 [cs.LG], Advances in Neural Information Processing Systems (NeurIPS), 2019.
Raghunathan, et al., "Certified Defenses Against Adversarial Examples," arXiv:1801.09344 [cs.LG], International Conference on Learning Representations (ICLR) 2018.
Lecuyer, et al., "Certified Robustness to Adversarial Examples with Differential Privacy," arXiv:1802.03471 [stat.ML], 2018.
Mohamed, et al., "Learning Essential Non-linear Feature Sub-space for Pattern Classification Using Hetero-Associative Neural Networks," IPCOM000181436D, Apr. 2, 2009.
Disclosed Anonymously, "Determining Validity of a Point of Interest Based on Existing Data", an IP.com Prior Art Database Technical Disclosure, IP.com No. IPCOM000252096D, IP.com Electronic Publication Date: Dec. 15, 2017, 33 pages.
Disclosed Anonymously, "Machine Learning to Select Best Network Access Point", An IP.com Prior Art Database Technical Disclosure, IP.com Publication No. IPCOM000252087D, IP.com Electronic Publication Date: Dec. 15, 2017, 35 pages.
Zhang et al., "Towards Stable and Efficient Training of Verifiably Robust Neural Networks", arXiv:1906.06316v2, Nov. 27, 2019, 25 pages.

* cited by examiner

ADAPTIVE ROBUSTNESS CERTIFICATION AGAINST ADVERSARIAL EXAMPLES

BACKGROUND

Technical Field

This disclosure relates generally to information security and, in particular, to using verifiable training to create neural networks that are provably robust to a given amount of noise.

Background of the Related Art

Machine learning technologies, which are key components of state-of-the-art Artificial Intelligence (AI) services, have shown great success in providing human-level capabilities for a variety of tasks, such as image recognition, speech recognition, natural language processing, and others. Most major technology companies are building their AI products and services with deep learning models (e.g., deep neural networks (DNNs)) as the key components. Building a production-level deep learning model is a non-trivial task, as it requires a large amount of training data, powerful computing resources, and human expertise. For example, training a Convolutional Neural Network (CNN) to perform image classification using a dataset containing millions of images may take from several days to several weeks on multiple GPUs. In addition, designing a deep learning model requires significant machine learning expertise and numerous trial-and-error iterations for defining model architectures and selecting model hyper-parameters.

Recent studies have found that these models are vulnerable to adversarial attacks. Adversarial attacks intentionally inject small perturbations (also known as "adversarial noise") to a model's data input to cause predictable misclassifications. In image classification, researchers have demonstrated that such imperceptible lead the classifier to fail to perceive an object, or to mislabel it. In the text domain, for example, synonym substitution or character/word level modification on a few words can domain-specific misclassifications. These perturbations, while mostly imperceptible to humans, cause large shifts in the output confidence of otherwise high-performance deep learning models.

Given the interest in adversarial examples, carefully crafted inputs that induce predictable errors in neural networks, many adversarial defense techniques have been proposed. One area of interest is verifiably robust training methods, such as Crown-IBP. Given a desired robustness criterion, usually denoted as epsilon ($\in$), verifiably robust training trains a neural network such that the network is certified to be robust (i.e., for a given input, the model's prediction will remain consistent) with respect to $\in$. The current state-of-the-art approach uses a single value of E when creating a certifiably-robust model. Using a single robustness criterion, however, fails to account for inherent similarities present in the input data. Highly similar classes, such as images of dogs and cats, can be hard for a neural network to identify naturally and even harder when the network must also be robust to adversarial noise. Furthermore, highly dissimilar classes, such as images of dogs and cars, may be easily separable and thus allow for larger values of epsilon to be used during certification. If the robustness criteria is too strict (i.e. too large), then the natural performance of the model will suffer due to similar classes.

BRIEF SUMMARY

The subject matter herein provides for "adaptive verifiable training," enabling the creation of machine learning models robust with respect to multiple robustness criteria. In one embodiment, adaptive verifiable training exploits inherent inter-class similarities within input data and enforces multiple robustness criteria based on this information. Between classes in the same cluster, the approach enforces looser robustness criterion (i.e., smaller $\in$) so as to minimize possible overlap when estimating the robustness region during verification. Between classes in different classes, on the other hand, the approach enforces stricter robustness regions (i.e., larger $\in$).

According to more specific aspects, adaptive verifiable training as described herein preferably exploits pairwise class similarity and improves the performance of a robust model by relaxing robustness constraints for similar classes and increasing robustness constraints for dissimilar classes. If pairwise class relationships are not available initially (e.g., by being pre-defined), preferably they are generated by receiving a pre-trained classifier and then applying a clustering algorithm (e.g., agglomerative clustering) to generate them. Once the received (pre-defined) or computed pairwise relationships are available, one of several techniques are then implemented to create classifiers for multiple robustness criteria.

In one embodiment, referred to herein as a Neural Decision Tree (NDT), this is achieved by creating a hierarchical classifier with a tree structure, and each node in the tree is a classifier over groups of classes. A node classifies groups of classes. For each of these groups, there is a child node. The child node recursively classifies the corresponding groups of classes until groups contain only one class. Each node is then trained using a certification method with different E values.

In an alternative embodiment, referred to herein as Inter-Group Robustness Prioritization (IGRP), a single model is trained by dynamically applying a robustness region parameter ($\in$) based on the sample's distance to other samples, or similarity of predicted classes. This approach leverages the sample's distance to other samples, and it applies a smaller robustness region if there is a similar sample in the input space. Also, preferably the robust loss function is modified to incorporate different types of group loss, e.g., an inner loss, and an outer loss, which together provide a custom loss function. Inner (group) loss refers to the loss for similar class pairs, and thus uses a smaller epsilon value. Outer (group) loss refers to the loss for dissimilar class pairs.

Whether implemented using NDT or IGRP, the resulting classifier is then utilized for a classification task that is robust against adversarial noise.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
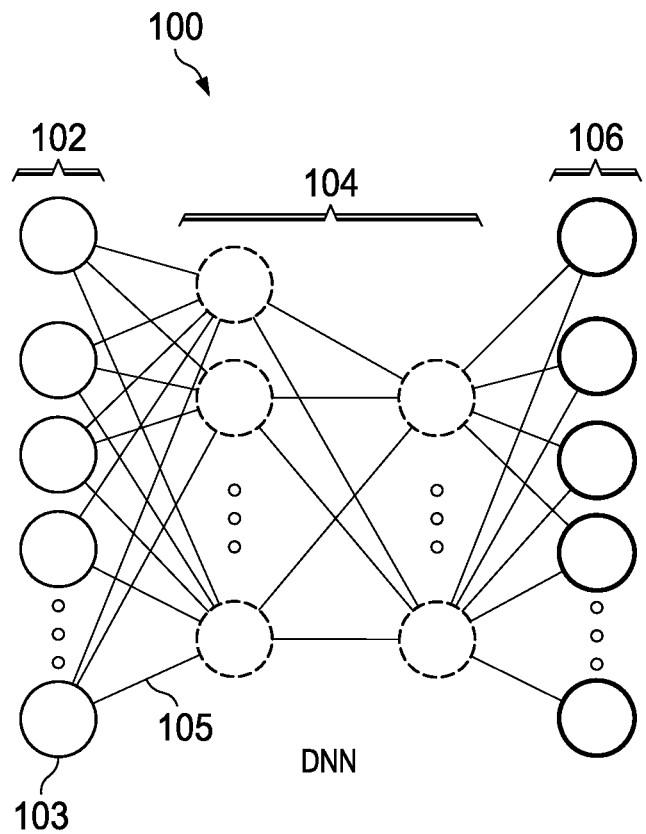
FIG. 1 depicts a representative deep learning model (DNN)

As will be seen, the technique herein provides for enhancing the robustness of a neural network against adversarial attack. By way of background, the following provides basic principles of deep learning.

As is well-known, deep learning is a type of machine learning framework that automatically learns hierarchical data representation from training data without the need to handcraft feature representation. Deep learning methods are based on learning architectures called deep neural networks (DNNs), which are composed of many basic neural network units such as linear perceptrons, convolutions and non-linear activation functions. Theses network units are organized as layers (from a few to more than a thousand), and they are trained directly from the raw data to recognize complicated concepts. Lower network layers often correspond with low-level features (e.g., in image recognition, such as corners and edges of images), while the higher layers typically correspond with high-level, semantically-meaningful features.

Specifically, a deep neural network (DNN) takes as input the raw training data representation and maps it to an output via a parametric function. The parametric function is defined by both the network architecture and the collective parameters of all the neural network units used in the network architecture. Each network unit receives an input vector from its connected neurons and outputs a value that will be passed to the following layers. For example, a linear unit outputs the dot product between its weight parameters and the output values of its connected neurons from the previous layers. To increase the capacity of DNNs in modeling the complex structure in training data, different types of network units have been developed and used in combination of linear activations, such as non-linear activation units (hyperbolic tangent, sigmoid, Rectified Linear Unit, etc.), max pooling and batch normalization. If the purpose of the neural network is to classify data into a finite set of classes, the activation function in the output layer typically is a softmax function, which can be viewed as the predicted class distribution of a set of classes.

Prior to training the network weights for a DNN, an initial step is to determine the architecture for the model, and this often requires non-trivial domain expertise and engineering efforts. Given the network architecture, the network behavior is determined by values of the network parameters. More formally, let $D=\{x_i, z_i\}^T_{i=1}$ be the training data, where $z_i$·[0, n−1] is a ground truth label for $x_i$, the network parameters are optimized to minimize a difference between the predicted class labels and the ground truth labels based on a loss function. Currently, the most widely-used approach for training DNNs is a back-propagation algorithm, where the network parameters are updated by propagating a gradient of prediction loss from the output layer through the entire network. Most commonly-used DNNs are feed-forward neural networks, wherein connections between the neurons do not form loops; other types of DNNs include recurrent neural networks, such as long short-term memory (LSTM), and these types of networks are effective in modeling sequential data.

Formally, a DNN has been described in literature by a function g: X→Y, where X is an input space, and Y is an output space representing a categorical set. For a sample x that is an element of X, $g(x)=f_L(F_{L-1}( \ldots ((f_1(x))))$. Each $f_i$ represents a layer, and $F_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes.

FIG. 1 depicts a representative DNN 100, sometimes referred to an artificial neural network. As depicted, DNN 100 is an interconnected group of nodes (neurons), with each node 103 representing an artificial neuron, and a line 1010 representing a connection from the output of one artificial neuron to the input of another. In the DNN, the output of each neuron is computed by some non-linear function of the sum of its inputs. The connections between neurons are known as edges. Neurons and the edges typically have a weight that adjusts as learning proceeds. The weight increases or decreases the strength of the signal at a connection. As depicted, in a DNN 100 typically the neurons are aggregated in layers, and different layers may perform different transformations on their inputs. As depicted, signals (typically real numbers) travel from the first layer (the input layer) 102 to the last layer (the output layer) 104, via traversing one or more intermediate (the hidden layers) 106. Hidden layers 106 provide the ability to extract features from the input layer 102. As depicted in FIG. 1, there are two hidden layers, but this is not a limitation. Typically, the number of hidden layers (and the number of neurons in each layer) is a function of the problem that is being addressed by the network. A network that includes too many neurons in a hidden layer may overfit and thus memorize input patterns, thereby limiting the network's ability to generalize. On the other hand, if there are too few neurons in the hidden layer(s), the network is unable to represent the input-space features, which also limits the ability of the network to generalize. In general, the smaller the network (fewer neurons and weights), the better the network.

The DNN 100 is trained using a training data set, thereby resulting in generation of a set of weights corresponding to the trained DNN. Formally, a training set contains N labeled inputs where the $i^{th}$ input is denoted $(x_i, y_i)$. During training, parameters related to each layer are randomly initialized, and input samples $(x_i, y_i)$ are fed through the network. The output of the network is a prediction $g(x_i)$ associated with the $i^{th}$ sample. To train the DNN, the difference between a predicted output $g(x_i)$ and its true label, $y_i$, is modeled with a loss function, $J(g(x_i), y_i)$, which is back-propagated into the network to update the model parameters.

Figure 2:
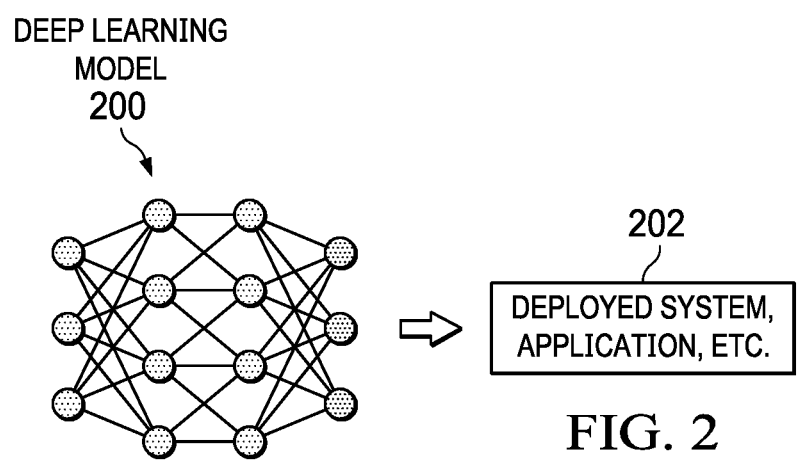
FIG. 2 depicts a deep learning model used in association with a deployed system or application.

FIG. 2 depicts a DNN 200 deployed as a front-end to a deployed system, application, task or the like 202. The deployed system may be of any type in which machine learning is used to support decision-making. As noted above, neural networks such as described are vulnerable to adversarial attacks, which attacks are design to intentionally inject small perturbations ("adversarial noise") to a model's data input to cause misclassifications. In image classification, researchers have demonstrated that imperceptible changes in input can mislead the classifier. In the text domain, for example, synonym substitution or character/word level modification on a few words can also cause the model to misclassify. These perturbations are mostly imperceptible to humans but can easily fool a high-performance deep learning model. For exemplary purposes, it is assumed that the above-described DNN 100 (FIG. 1) or DNN 200 (FIG. 2) is subject to adversarial attack. The technique of this disclosure is then used to enhance the robustness of that network. The resulting network is then said to be adversarially-robust, meaning that—as compared to the network that does not incorporate the described technique—the resulting network is better able to provide the requisite classification task even in the face of adversarial examples. Stated another way, adversarial robustness can be thought of as consistency in the presence of adversarial noise.

The particular neural network, the nature of its classification, and/or the particular deployment system or strategy are not limitations of the technique herein, which may be employed to strengthen any type of network classifier regardless of its structure and use.

Dramatic improvements in the accuracy of neural networks on various tasks has been made, but their robustness often is not prioritized. With poor robustness, however, the security and reliability of models is in question when exposed to adversarial noise. Despite appearing indistinguishable from a normal input, adversarial noise consistently induces predictable errors in machine learning models. While many defensive techniques have been developed, most fall short, as they obfuscate the discovery process rather that truly reducing the number of adversarial examples to which a model is vulnerable. That said, one effective defense against adversarial examples is verifiable training, as it creates models with provable robustness guarantees. With respect to a robustness criterion, which identifies a region around an input where the model's prediction must remain stable, verifiable training maximizes the potential number of input samples a model is certified to be robust for within that region.

Although verifiable robust training creates models with provable robustness, it often comes at the cost of lower performance on clean data. For example, on CIFAR10, a LeNet model trained using CROWN-IBP, a state-of-the-art verifiable training method, with respect to a $L_\infty$ robustness region=8/255, has significantly lower clean performance compared to a model created through normal training (i.e. 57.10% error rate vs. 21.53% error rate). With such poor baseline performance, certified performance on adversarial samples is limited, having only a 69.92% error rate. This means that, in presence of an adversary, only about 30% of the inputs are guaranteed to be correctly classified.

The poor performance of existing verifiable training methods is due to using only a single robustness criterion. During verification, the robustness region around an input is estimated and used to determine if the decision is stable within the region. Verifiable training attempts to shape the decision boundary so as to maximize the number of inputs the model's decision is stable for within the robustness region. However, inputs belonging to similar classes may have overlapping estimations of their robustness regions, thus resulting in high confusion between these classes. For example, a robust LeNet model trained on CIFAR10 mislabels a dog as a cat 33.53% of the time, whereas it mislabels a dog as a car only 7.48% of the time. These inherent inter-class similarities in the data limit the natural performance of verifiable training if only a single robustness criterion is used. Additionally, the inter-class similarity also can represent the relative sensitivity cost of a misclassification. In safety or security critical tasks, the cost of misclassifying similar classes is likely lower than the cost of misclassifying dissimilar ones. In autonomous driving, e.g., misidentifying a Speed Limit 40 sign as a Speed Limit 30 causes the car to change its speed only. Misidentifying a Speed Limit sign as a Stop sign, however, causes the car to come to a sudden halt.

It has been recognized that using different robustness criteria during training based on inter-class similarity provides significant advantages over prior techniques, as will now be described.

Adaptive Verifiable Training

According to this disclosure, the notion of adaptive verifiable training is provided as a method for creating machine learning models with multiple robustness certificates. As noted above, existing verifiable training creates a model that is only robust with respect to a single robustness criterion based on the assumption that all errors are equal. The technique of this disclosure, in contrast, is premised on the notion that certain errors made by the model, whether due to natural error or adversarial manipulation, are easier to make due to the inherent similarities between classes. Classes that are highly similar (e.g., dogs and cats) limit model performance when the robustness criterion is overly strict due to overlapping robustness regions during verification. The approach addresses this problem by creating models with relaxed robustness criteria between or among similar classes, while maintaining strict robustness criteria between or among dissimilar classes. To this end, and according to one embodiment herein, inter-class relationships are identified (by either being pre-defined or determined), and robustness criteria are defined to enforce with respect to these relationships. Once defined, robustness constraints are then enforced, preferably using one of several techniques, namely, Neural Decision Trees (NDT), or Inter-Group Robustness Prioritization (IGRP).

Figure 3:
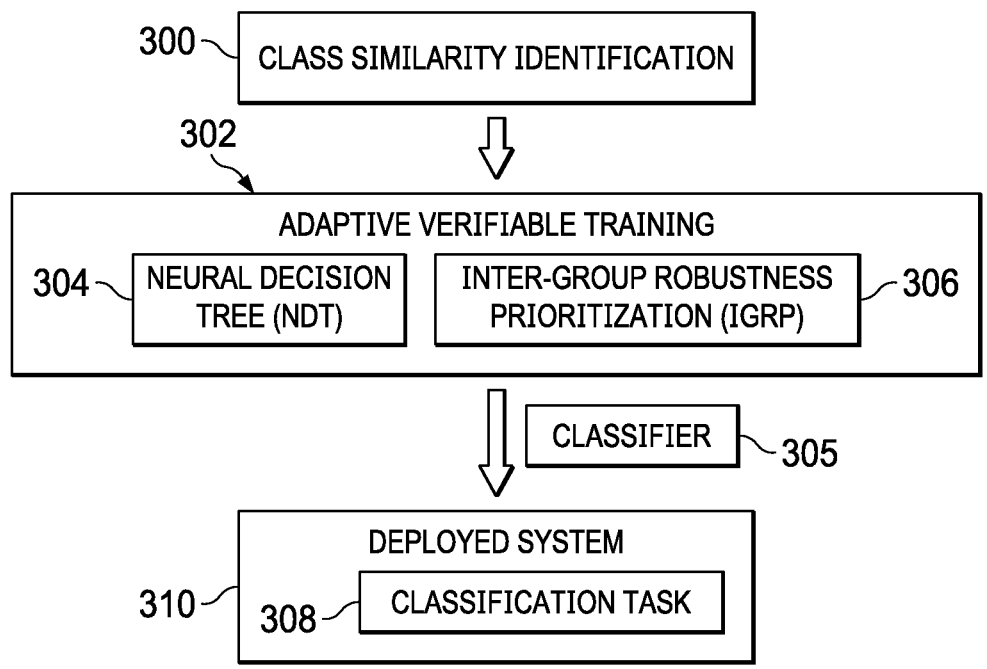
FIG. 3 is a high level process flow depicting adaptive verifiable training using pairwise class similarity according to this disclosure.
Figure 4:
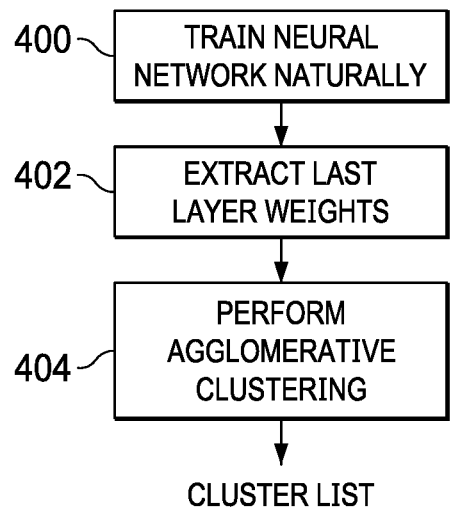
FIG. 4 depicts a class similarity identification process for use to identify similar class pairs when such information is not available.

FIG. 3 depicts a high level process flow according to the technique of this disclosure. Typically, the first step of the approach described herein is to identify similar class pairs and infer which relationships should have relaxed robustness constraints. This is sometimes referred to as class similarity identification, as indicated at step 300. In one embodiment, the pairwise class relationships are predefined and otherwise available for use. In an alternative embodiment, pairwise class relationships are not necessarily available and need to be built. Preferably, and absent pre-defined pairwise class relationships, some form of clustering algorithm (e.g. agglomerative clustering) is used to define the similarity between classes. One technique for accomplishing this is depicted in FIG. 4 and described below. Referring back to FIG. 3, following class similarity identification, the method then continues at step 302 to apply the adaptive verifiable training to define the robustness criterion E to certify a model against for each group. Step 302 applies a smart label grouping algorithm. The choice of epsilon E depends on the use case or user, however, in general according to this disclosure as the class similarity decreases, the robustness criterion (as noted, typically determined by the user) can increase. As depicted in FIG. 3, preferably one of two approaches are used for this purpose, namely, a first method 304 that uses a Neural Decision Tree (NDT) with mixed robustness classifiers, or a second method 306 that uses a single classifier trained with a customized loss using an Inter-Group Robustness Prioritization (IGRP) scheme. Typically, either method 304 or method 306 is used, although there may be circumstances where it is desirable to apply both methods. The resulting classifier 305 is then applied to a classification task at step 308 associated with a deployed system or application.

As noted above, there may be circumstances where the pairwise class relationship data is available (pre-configured, predefined or otherwise available). In such case, one of the methods 304 or 306 may then be applied. When such information is not available, it must be obtained initially. FIG. 4 depicts a preferred process for doing so. At step 400, the process begins by training a neural network (classifier) naturally. At step 402, the last layer weights are extracted from the trained network. At step 404, agglomerative clustering is applied to provide the label grouping (based on label similarity), namely, a cluster list. In this approach, and given the weights of the penultimate layer of the pre-trained classifier, agglomerative clustering pairs classes together based on a similarity metric. After creating the initial clusters, the process iteratively combines smaller clusters into larger clusters using the same similarity metric, until only a single cluster remains.

Figure 5:
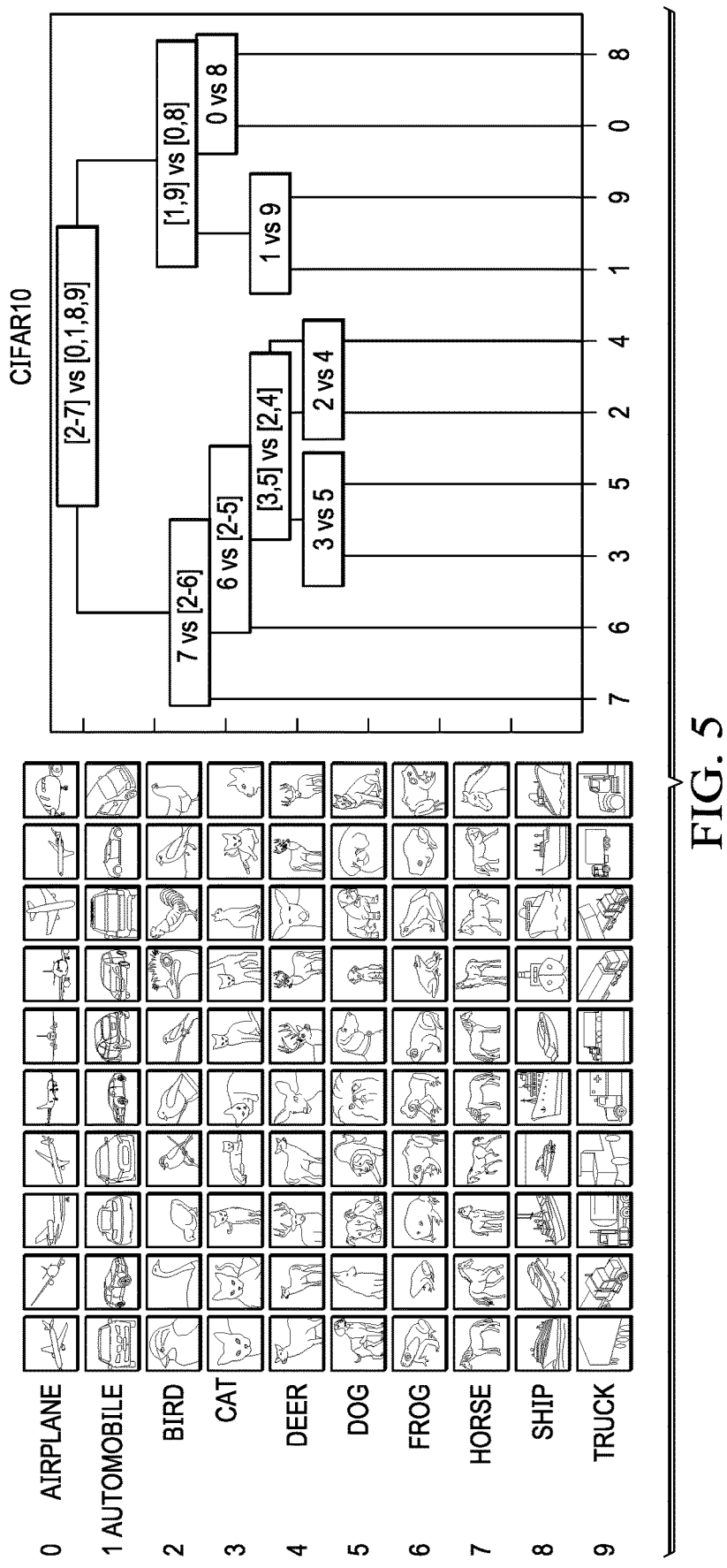
FIG. 5 depicts how agglomerative clustering is used for class similarity identification in a representative dataset (CIFAR10)

FIG. 5 depicts a common dataset of images (CIFAR10) and how agglomerative clustering may be used. The CIFAR10 dataset is a collection of images that are commonly used to train machine learning and computer vision algorithms. It contains 60,000 32×32 color images in ten (10) different classes, namely, airplanes, cars, birds, cats, deer, dogs, frogs, horses, ships and trucks, and there are thousands of images in each class.

Once the classes have been clustered, and according to this disclosure, robustness criteria are then defined to certify a model against for each group. As noted above, and while the robustness criteria may vary, in general the robustness criterion can increase as the class similarity decreases.

Generalizing, and given two or more groups, robustness criterion E that the model seeks to enforce with respect to the inter-group classification is defined. One of several methods are then implemented to apply the adaptive verifiable training. Each of these methods is now described.

Inter-Group Robustness Prioritization

The IGRP methods follows traditional verifiable training techniques and trains a single robust model. Unlike prior work, however, the model created using IGRP is able to enforce multiple robustness criteria for the different class groups.

The following assumes familiarity with traditional verifiable training techniques. In particular, in neural network verification, a verification specification for an input sample $x_k$ is defined by a specification matrix $c \in \mathbb{R}^{n_L \times n_L}$ where $n_L$ is the number of classes. Given the true label y, the specification matrix is then defined as:

$$C_{i,j} = \begin{cases} 1 & \text{if } j = y, i \neq y \\ -1 & \text{if } i = j, i \neq y \\ 0 & \text{otherwise} \end{cases}$$

Thus, for each row vector $c_i \in \mathbb{R}^{n_L}$ in the specification matrix, the index of the true label is 1, the index of the current label I is −1, and all other indices are 0. Further, for the row vector $c_y$ corresponding to the true label, all indices are 0.

The above definition is then used to define a margin vector $m(x) := Cf(x) \in \mathbb{R}^{n_L}$ where each element $m_i$ in the margin vector denotes the margin between class y and the other class i (i.e. $f_y(x) - f_i(x)$). Next, given the robustness region $S(x, \epsilon) = \{x : \|x_k - x\|_p \leq \epsilon\}$, define the lower bound of $Cf(x)$ for all $x \in S(x, \epsilon$ as $\underline{m}^*(x, \epsilon)$. When all elements in $\underline{m}(x, \epsilon) > 0$, $x_k$ is verifiably robust for any perturbation in $S(x, \epsilon)$.

As further background, a min-max robust optimization widely used in adversarial training is defined as:

$$\min_\theta E_{(x,y) \in \mathcal{D}} \left[ \max_{\|\delta\|_p \leq \epsilon} L(f(x+\delta); y; \theta) \right]$$

Due to the non-linearity of neural networks, the inner maximization problem becomes challenging to solve. Rather than solve this problem, it has been shown that a worst-case margin vector can serve as a sound upper bound, i.e.:

$$\max_{\|\delta\|_p \leq \epsilon} L(f(x+\delta); y; \theta) \leq L(-\underline{m}(x, \epsilon); y; \theta)$$

Traditional verifiable training uses the above equation and then trains the model to minimize this upper bound; this, in turn, minimizes the original inner maximization upper bound of the robust loss (in the min-max robust optimization equation) such that the model can learn to be verifiably robust with respect to $\epsilon$.

With the above as background, and order to support multiple robustness criteria during verifiable training, IGRP preferably defines a custom lost function comprising at least two types of loss relationships: an outer group loss, and an inner group loss. Given a set of class groups $G_1, G_2 \ldots G_k$ and a true label y, the outer group loss $L_{outer}$ is defined as the loss between the group the true label belongs to, $G^y$, and the other groups. When computing worst case margin values, preferably classes that are within the same group as the true label y are not considered, e.g., by being zeroed out. Formally, a verification specification matrix for the outer loss is then defined as:

$$C_{i,j}^o = \begin{cases} 1 & \text{if } j = y, i \neq y, G^i \neq G^y \\ -1 & \text{if } i = j, i \neq y, G^i \neq G^y \\ 0 & \text{otherwise} \end{cases}$$

The margin vector for the outer robustness criteria is defined as $m^O(x) = C^O f(x)$ and the outer loss is defined as $L_{outer} = L(-\underline{m}^O(x, \epsilon^O); y; \theta)$.

Similarly, given a set of class groups $G_1, G_2 \ldots G_k$ and the true label y, the inner group loss, $L_{inner}$, is defined as the loss between labels belonging to the same group as the true label. When computing worst-case margin values, classes that are in a different group as the true label y preferably are not considered, once again by being zeroed out. Formally, the verification specification matrix for the inner loss is then defined as:

$$C_{i,j}^I = \begin{cases} 1 & \text{if } j = y, i \neq y, G^i = G^y \\ -1 & \text{if } i = j, i \neq y, G^i = G^y \\ 0 & \text{otherwise} \end{cases}$$

The margin vector for the inner robustness criterial is defined as $m^I(x)=C^I f(x)$ and the inner loss is defined as $L_{inner}=L(-m^I(x, \in^I); y; \theta$.

Given the definitions of $L_{outer}$ and $L_{inner}$, an IGRP training objective is defined as:

$$L_{IGRP}=L_{outer}+L_{inner}$$

By using verifiable training to minimize the above equation, adaptive verifiable training is then used to train a single robust model. Dissimilar classes are clustered into different class groups, so the outer loss term enforces a strict robustness criterion between those groups. Similar classes, however, are clustered into the same class group, so the inner loss term enforces a loose robustness criterion between those groups. Further, if multiple outer and inner group relationships exist, a new inner or outer loss term is simply added to $L_{IGRP}$. Note also that the computational cost of IGRP is theoretically the same as traditional verifiable training, as it is only needed to estimate the worst-case margin value for each class once during verification even though multiple robustness distances may be considered.

Figure 6:
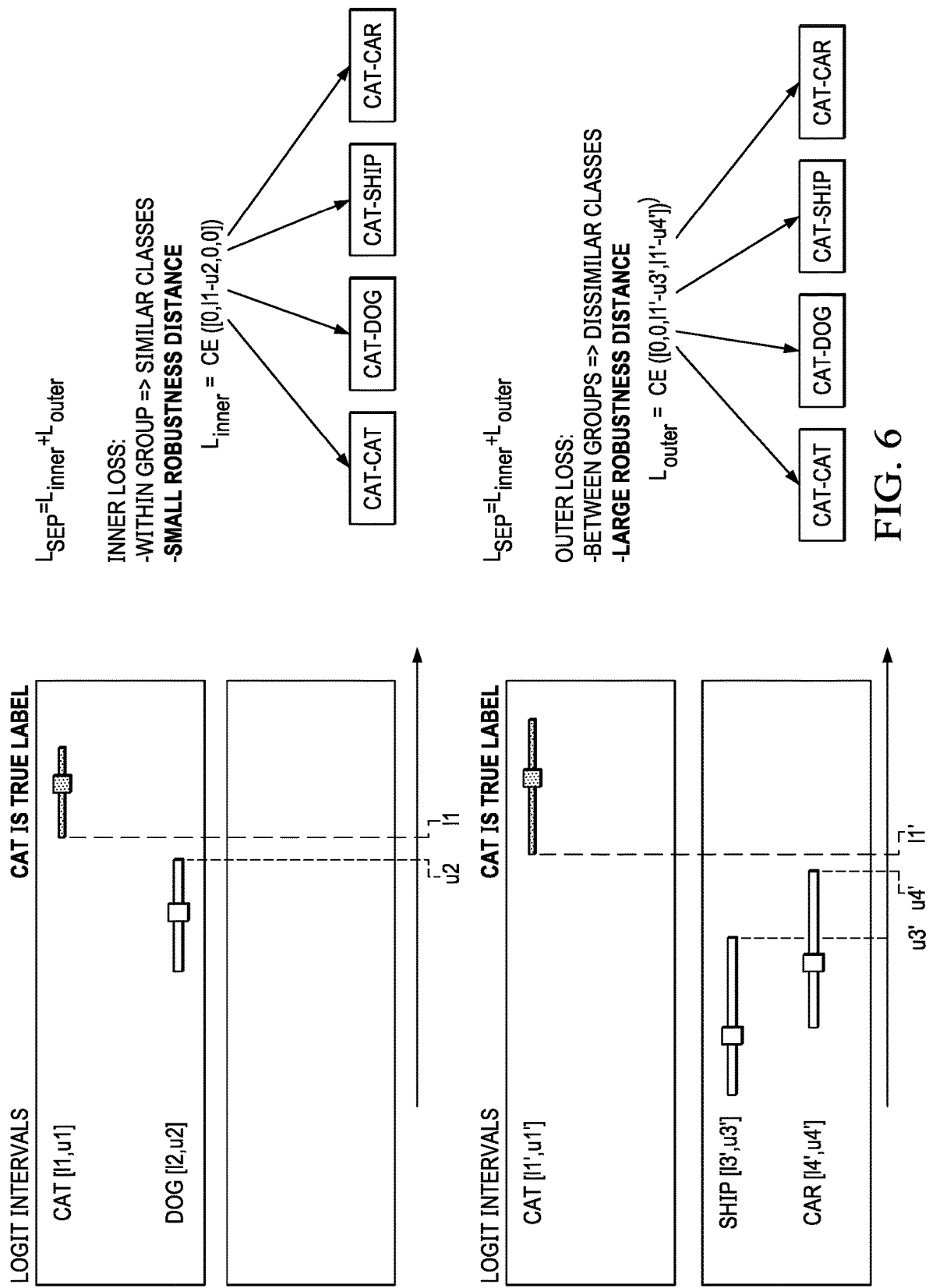
FIG. 6 depicts an example of a first Inter-Group Robustness Prioritization (IGRP) method for applying adaptive verifiable training using a custom loss function according to this disclosure.
Figure 7:
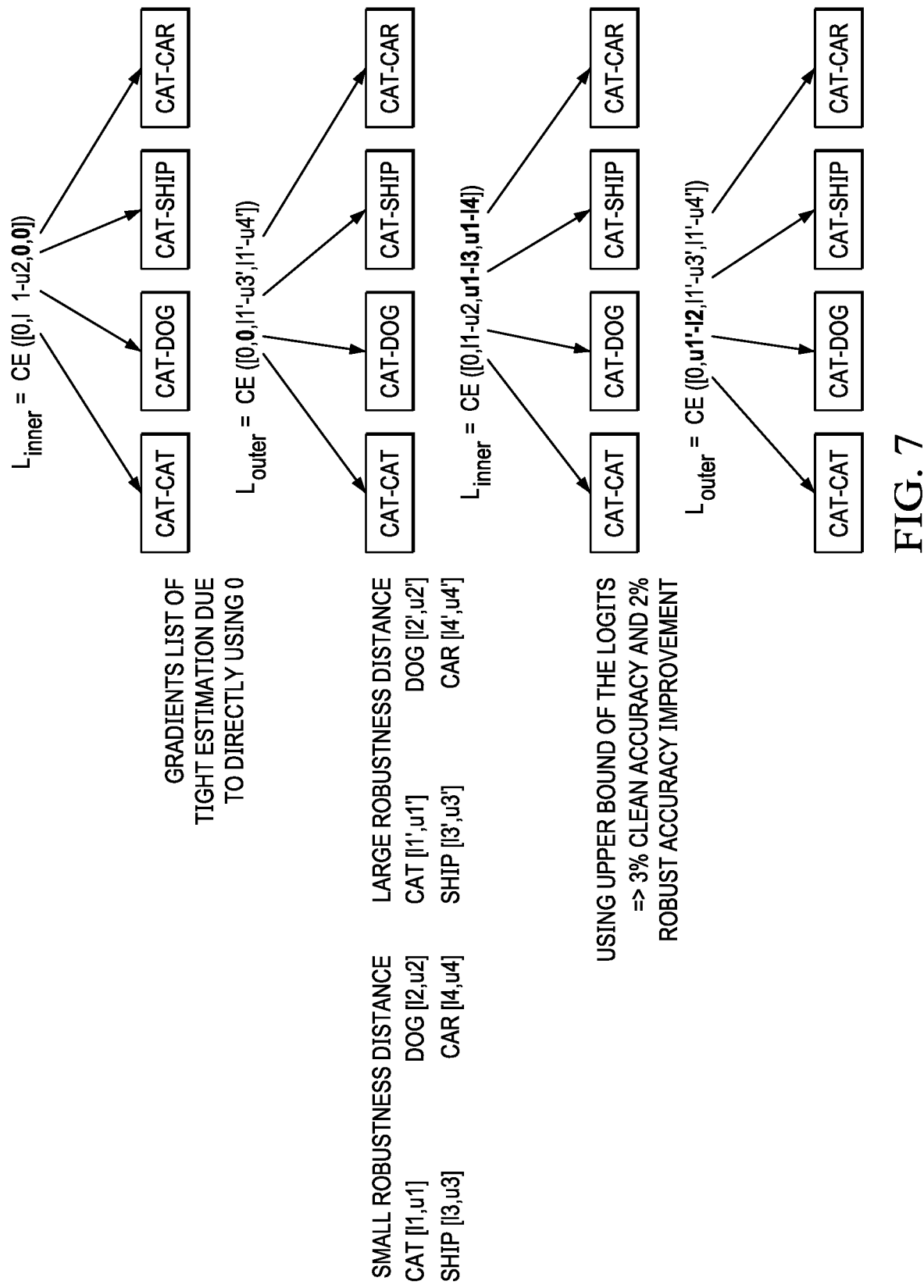
FIG. 7 depicts the IGRP scheme outputs from FIG. 6 adapted to include an Upper Bound Performance (UBS) optimization.

FIG. 6 depicts examples of how a single classifier with the customized loss function is used. The upper portion in FIG. 6 depicts an example of how the inner loss is computed within the depicted group of similar classes (animals, namely, cats and dogs). The lower portion in FIG. 6 depicts an example of how the outer loss is computed between groups representing dissimilar classes (animals, and vehicles). To improve performance, one or more additional techniques may be used. One such technique is Upper Bound Scattering (UBS). In UBS, and instead of zeroing out the worst-case logits of outer (or inner) group labels when calculating the inner (or outer) loss for IGRP, the respective group labels' best-case logits are used. FIG. 7 depicts the UBS optimization applied to the inner and outer loss results (from FIG. 6), by way of example. In particular, the upper portion of FIG. 6 shows the inner and outer loss results, and the lower portion shows how the computations change when UBS is employed. Compared to IGRP, IGRP-UBS allows verifiable training to maintain more gradients, thus improving the estimation precision during verification.

Another performance improvement that may be implemented for IGRP is Model Fine Tuning (FT), which is a known technique.

Neural Decision Tree

A second approach to apply the adaptive verifiable training is a Neural Decision Tree (NDT). An NDT is a decision is a decision tree where each node in the tree is a neural network classifier. This architecture is well-suited to enforcing multiple robustness constraints by simply training each node using a different value of ∈. It is not required that each node take on a different epsilon value, but this is typically the case. In this approach, and once classes have been clustered together (either using agglomerative clustering or based on a predefined cluster list), the approach here trains individual models for separating the clusters. Then, as an input is passed through the tree, the models become more fine-grained in their prediction, eventually reaching a point where only a single class is output. The final prediction of the NDT is made when only a single class label is predicted. To provide a concrete example, consider the CIFAR10 data set described above with respect to FIG. 10. After using agglomerative clustering on CIFAR10 with a binary split, the root node determines if an input belongs to the grouping: [bird, cat, dog, deer, frog, horse] or the grouping [airplane, car, ship, truck]. Assume now that the right child is always predicted. The next node classifier predicts if the input belongs to [airplane, ship] or [car, truck]. Finally, the final node predicts if the input is either a car or a truck.

Figure 8:
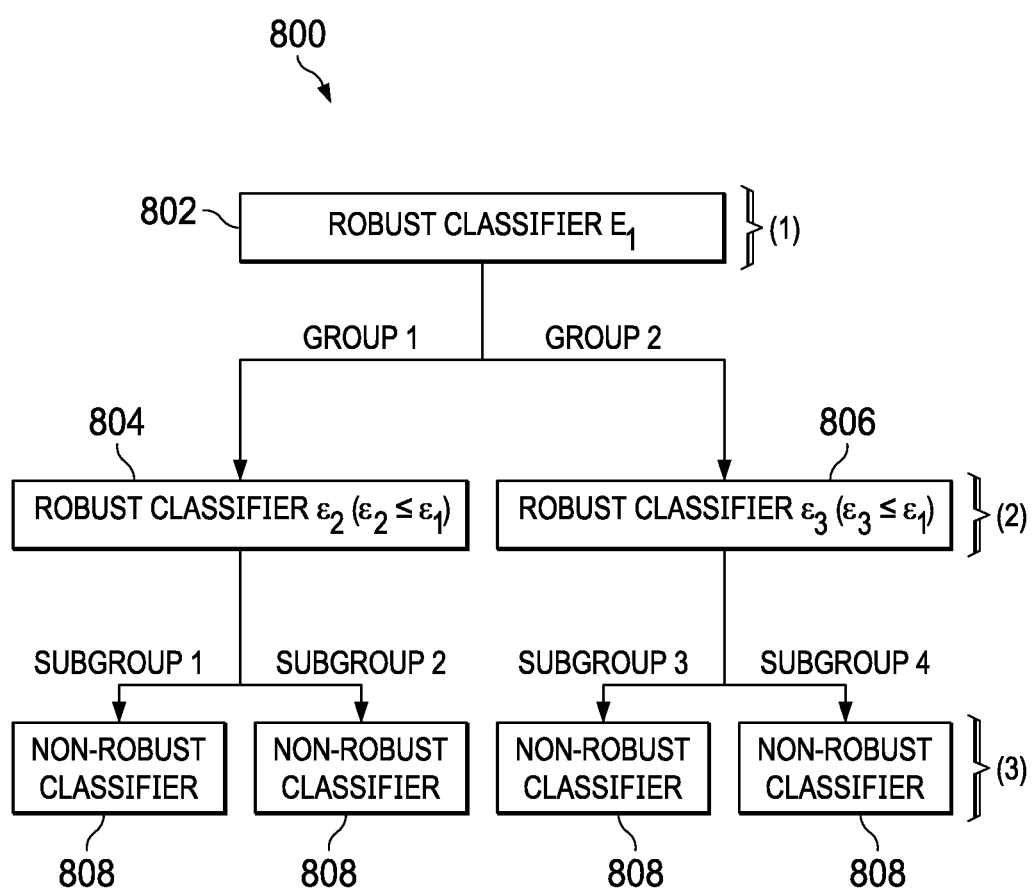
FIG. 8 depicts an example of a second method for applying adaptive verifiable training, in this case using a Neural Decision Tree (NDT) architecture.

Generalizing, FIG. 8 depicts a basic NDT architecture, namely, an NDT tree 800. The tree 800 comprises a classifier at each node, including a root node classifier 802, group classifiers 804 and 806, and classifiers 808 at the leaf nodes. Given an input (1), each node determines to which of two groups of class labels the input belongs. Once identified, (2) input is passed to the next respective model in the tree; (3) finally, at the leaf nodes, if the predicted subgroup only contains a single label, a final classification is output. The predicted class is determined by the path of the input through the NDT.

Figure 9:
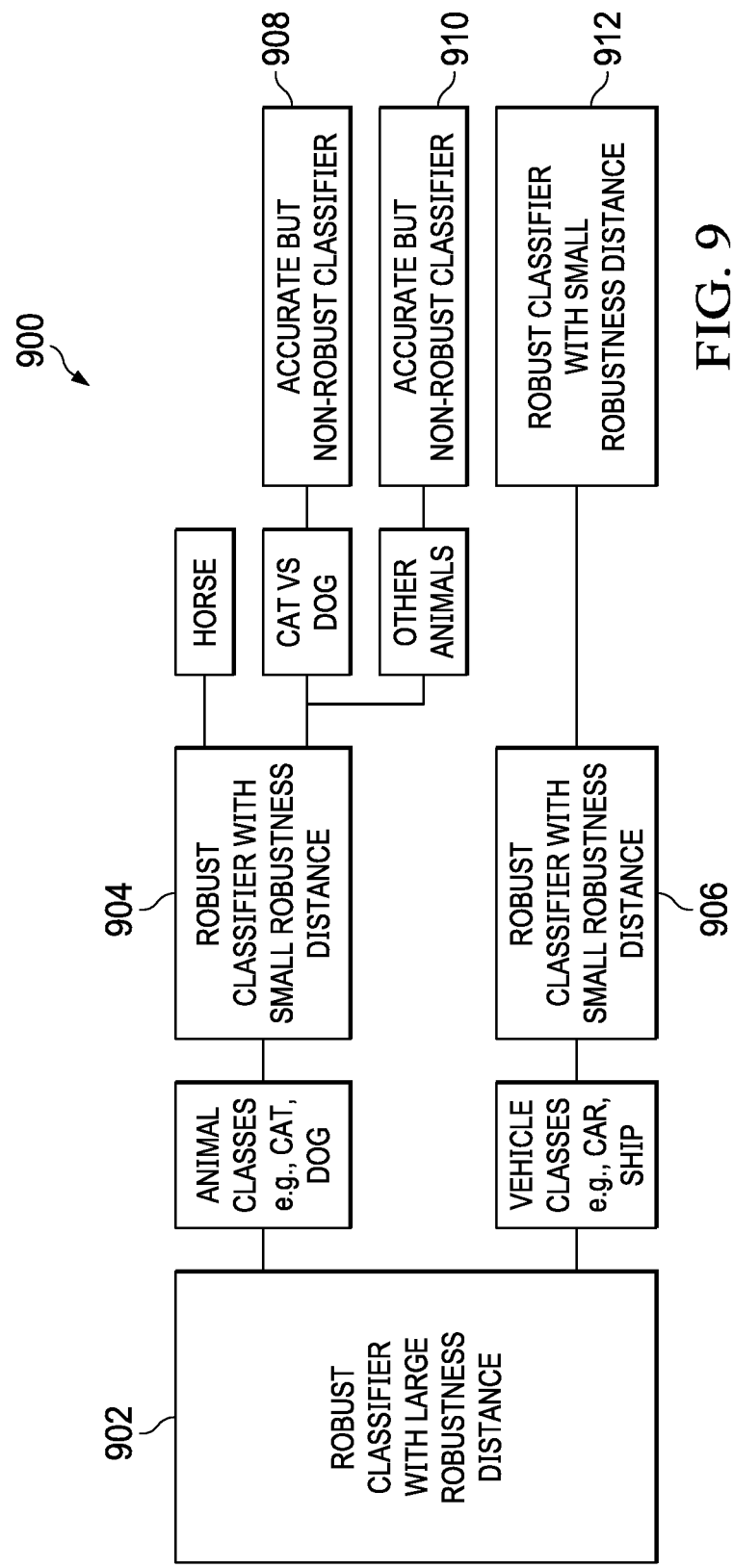
FIG. 9 is a representative NDT.

FIG. 9 depicts a concrete example of an ensemble of mixed-robustness classifiers comprising NDT 900. This tree includes non-robust classifiers that are naturally-trained, weak robust classifiers that are trained with small robustness distance, and strong robust classifiers trained with large robustness distance. Continuing with the above example CIFAR10 data set, the root node 902 is a robust classifier with large robustness distance. A pair of robust classifiers each with small robustness distances provide the group classifiers 904 and 906. For the animal groupings, there are two leaf nodes 908 and 910, each of which is an accurate but non-robust classifier. The vehicle classes also include another classifier 910, but this classifier is also robust with small robustness distance in this example. Other leaf nodes are included but not shown.

As each node in the tree is distinct, the NDT approach easily supports multiple robustness criteria depending on the similarity of the groups at a particular node. The only requirement is that the parent must be at least as robust as its children. Generally, the closer a node is to the root of the tree, the stricter the robustness criterion can be as the similarity between groups decreases. Although FIG. 9 shows a tree with a mix of binary robust and non-robust classifiers, this is not a limitation. In a variant, every node in the NDT is a robust binary classifier with respect to E. Another variant is a mixed NDT model is a neural decision tree in which only the root node is robust with respect to E; afterwards, all of the inner and leaf nodes are non-robust classifiers (i.e., trained using standard cross-entropy loss minimization). Another variant (for a mixed ensemble) involves reducing the depth of the tree by merging lower robust binary classifiers into a single non-robust classifier. In particular, if a sub-tree in the NDT contains classifiers that are all trained for the same robustness criteria, the sub-tree can be compressed into the single classifier to achieve similar or better performance depending on the size of the sub-tree. In a particular example, a truncated mixed NDT of this type is composed of two types of nodes. At the root and inner nodes robust binary classifiers trained with ∈=2/255 are used; at the leaf nodes, non-robust classifiers (created from compressing the rest of the tree) are used. The leaf nodes, as noted above, determine the final classification output.

The NDT approach herein is not limited to a tree with just binary nodes, and there can be different node splits for various nodes in the tree. For example, a representative tree may have a root node with five (5) children, each child has three (3) children, and then all generations thereafter are binary. Thus, the particular NDT model may be quite varied and implementation-specific without departing from the above-described principles.

UBS and FT may also be applied as performance enhancements for the NDT modeling.

Summarizing, in an example IGRP implementation, a deployed machine learning system receives as inputs: a cluster list (the class similarity identification), a classifier (that does not have the adaptive robustness guarantee), and a set of robustness constraints, the latter which are typically encoded as hyperparameters. The classifier is then retrained with the custom loss function described output, and the resulting retrained classifier having the adaptive robustness guarantee is then output to execute the adversarially-robust classification task.

In an example NDT implementation, a deployed system receives as inputs: a cluster list, an NDT model architecture for each node in the tree, and a robustness constraint to be enforced at each node. The robustness constraints are provided as hyperparameters. Based on the technique described herein, the output NDT with each node then having the adaptive robustness guarantee(s) is then provided for the classification task.

The technique described above has significant advantages. It provides for adaptive verifiable training, a new approach to verifiable training that enables current and future verifiable training techniques to train models that enforce multiple robustness criteria. As has been described, and absent pre-defined class groupings, preferably agglomerative clustering used on final layer weights of a pre-trained model automatically subdivide the classes into groups and sub-groups of similar classes. Given two or more groups, a robustness criterion E is then enforced during training based on the similarity of the groups. As the similarity between groups decreases, stricter robustness criteria are enforced. As also described, the approach herein provides several methods to apply adaptive verifiable training. The first, Inter-Group Robustness Prioritization (IGRP), follows traditional verifiable training techniques and uses a customized loss function to enforce multiple robustness criteria on a single model. The second, Neural Decision Tree (NDT), trains multiple robust and non-robust sub-classifiers and organizes them into a decision tree ensemble. Both methods result in robust models that, compared to state-of-the-art training techniques, improve performance on non-noisy data and achieved similar verifiable performance on adversarial data, despite enforcing multiple similarity-sensitive robustness criteria.

The technique herein may be used to apply multiple robustness criteria using an existing certification method, such as Crown-IBP. Initially, class similarity data is received or built, in the latter case using any clustering algorithm (e.g., agglomerative clustering) based on the final weights of a naturally trained neural network. As noted, one embodiment for applying adaptive verifiable training builds a hierarchical classifier with a tree structure, and each node is a classifier over groups of classes. A node classifies groups of classes. For each of these groups, there is a child node. The child node recursively classifies the corresponding groups of classes until groups contain only one class. Each node can then be trained using a certification method with different epsilon values. In an alternative training embodiment, a single model is trained by dynamically applying a robustness region parameter ($\in$) based on the sample's distance to other samples, or similarity of predicted classes. This leverages the sample's distance to other samples, and it applies a smaller robustness region if there is a similar sample in the input space. Also, the robust loss function can be modified to incorporate two different types of loss: inner and outer loss. Inner (group) loss refers to the loss for similar class pairs, and thus uses a smaller epsilon value. Outer (group) loss refers to the loss for dissimilar class pairs. The same strategy can also be applied for an arbitrary number of groups.

Although the clustering algorithm herein advantageously relies on inter-class similarities, the technique herein may also be used in where a user has its own class cluster definitions irrespective of any perceived similarity between classes in the same cluster, e.g., if a user defined the class clusters based on high risk or low risk classes.

The technique herein may be implemented as an architecture modification, alone or in combination with other existing adversarial defenses such as data augmentation (adversarial training, Gaussian smoothing, and others).

One or more aspects of this disclosure may be implemented as-a-service, e.g., by a third party. The subject matter may be implemented within or in association with a data center that provides cloud-based computing, data storage or related services.

In a typical use case, a SIEM or other security system has associated therewith an interface that can be used to issue API queries to the trained model, and to receive responses to those queries including responses indicator of adversarial input.

The approach herein is designed to be implemented on-demand, or in an automated manner.

Access to the service for model training or use to identify adversarial input may be carried out via any suitable request-response protocol or workflow, with or without an API.

Figure 10:
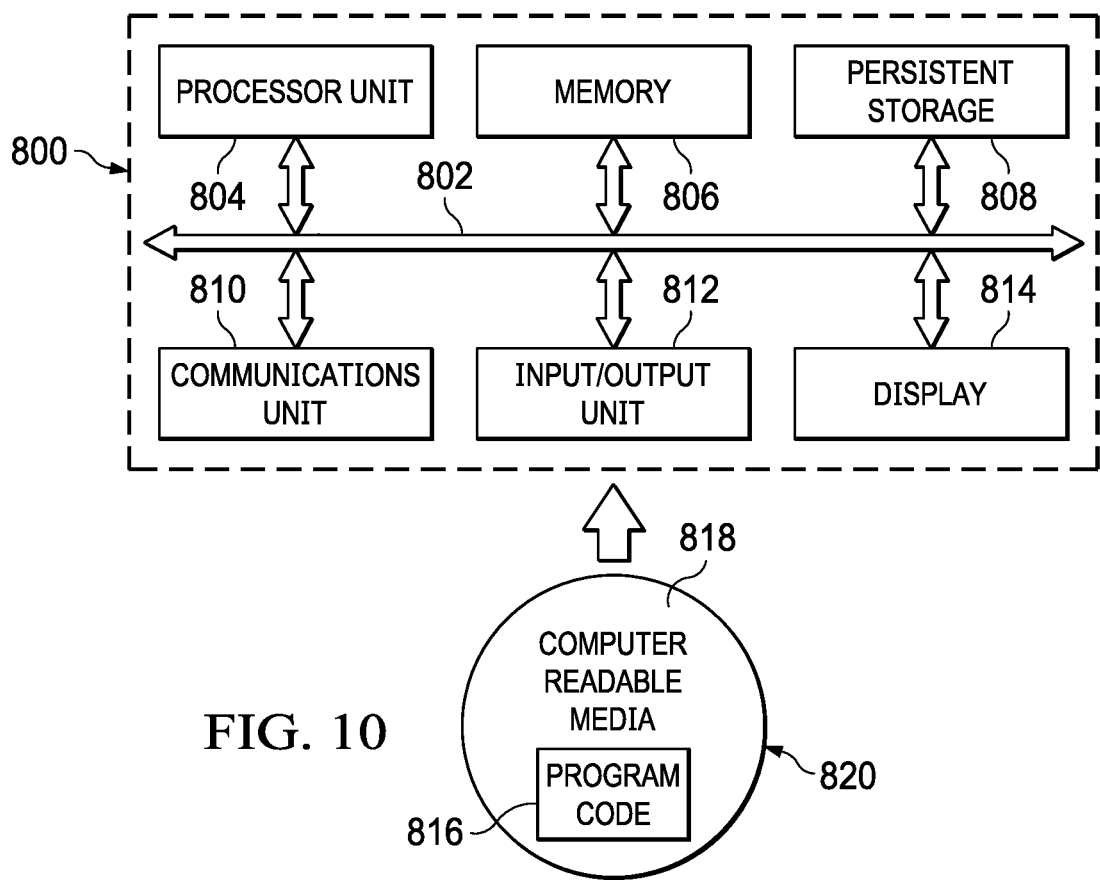
FIG. 10 is a block diagram of a data processing system in which exemplary aspects of the illustrative embodiments may be implemented.

FIG. 10 depicts an exemplary distributed data processing system in which the deployed system or any other computing task associated with the techniques herein may be implemented. Data processing system 1000 is an example of a computer in which computer-usable program code or instructions implementing the processes may be located for the illustrative embodiments. In this illustrative example, data processing system 1000 includes communications fabric 1002, which provides communications between processor unit 1004, memory 1006, persistent storage 1008, communications unit 1010, input/output (I/O) unit 1012, and display 1014.

Processor unit 1004 serves to execute instructions for software that may be loaded into memory 1006. Processor unit 1004 may be a set of one or more processors or may be a multi-processor core, depending on the particular implementation. Further, processor unit 1004 may be implemented using one or more heterogeneous processor systems in which a main processor is present with secondary processors on a single chip. As another illustrative example, processor unit 1004 may be a symmetric multi-processor (SMP) system containing multiple processors of the same type.

Memory 1006 and persistent storage 1008 are examples of storage devices. A storage device is any piece of hardware that is capable of storing information either on a temporary basis and/or a permanent basis. Memory 1006, in these examples, may be, for example, a random access memory or any other suitable volatile or non-volatile storage device. Persistent storage 1008 may take various forms depending on the particular implementation. For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard and mouse. Further, input/output unit 1012 may send output to a printer. Display 1014 provides a mechanism to display information to a user.

Instructions for the operating system and applications or programs are located on persistent storage 1008. These instructions may be loaded into memory 1006 for execution by processor unit 1004. The processes of the different embodiments may be performed by processor unit 1004 using computer implemented instructions, which may be located in a memory, such as memory 1006. These instructions are referred to as program code, computer-usable program code, or computer-readable program code that may be read and executed by a processor in processor unit 1004. The program code in the different embodiments may be embodied on different physical or tangible computer-readable media, such as memory 1006 or persistent storage 1008.

Program code 1016 is located in a functional form on computer-readable media 1018 that is selectively removable and may be loaded onto or transferred to data processing system 1000 for execution by processor unit 1004. Program code 1016 and computer-readable media 1018 form computer program product 1020 in these examples. In one example, computer-readable media 1018 may be in a tangible form, such as, for example, an optical or magnetic disc that is inserted or placed into a drive or other device that is part of persistent storage 1008 for transfer onto a storage device, such as a hard drive that is part of persistent storage 1008. In a tangible form, computer-readable media 10110 also may take the form of a persistent storage, such as a hard drive, a thumb drive, or a flash memory that is connected to data processing system 1000. The tangible form of computer-readable media 1018 is also referred to as computer-recordable storage media. In some instances, computer-recordable media 10110 may not be removable.

Alternatively, program code 1016 may be transferred to data processing system 1000 from computer-readable media 1018 through a communications link to communications unit 1010 and/or through a connection to input/output unit 1012. The communications link and/or the connection may be physical or wireless in the illustrative examples. The computer-readable media also may take the form of non-tangible media, such as communications links or wireless transmissions containing the program code. The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. As one example, a storage device in data processing system 1000 is any hardware apparatus that may store data. Memory 1006, persistent storage 1008, and computer-readable media 1018 are examples of storage devices in a tangible form.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1006 or a cache such as found in an interface and memory controller hub that may be present in communications fabric 1002.

The techniques herein may be used with a host machine (or set of machines, e.g., running a cluster) operating in a standalone manner, or in a networking environment such as a cloud computing environment. Cloud computing is an information technology (IT) delivery model by which shared resources, software and information are provided over the Internet to computers and other devices on-demand. With this approach, an application instance is hosted and made available from Internet-based resources that are accessible through a conventional Web browser or mobile application over HTTP. Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Typical cloud computing service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Typical deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

The system, and in particular the modeling and consistency checking components, typically are each implemented as software, i.e., as a set of computer program instructions executed in one or more hardware processors. The components may also be integrated with one another in whole or in part. One or more of the components may execute in a dedicated location, or remote from one another. One or more of the components may have sub-components that execute together to provide the functionality. There is no requirement that particular functions be executed by a particular component as named above, as the functionality herein (or any aspect thereof) may be implemented in other or systems.

The approach may be implemented by any service provider that operates infrastructure. It may be available as a managed service, e.g., provided by a cloud service. A representative deep learning architecture of this type is IBM® Watson® Studio.

The components may implement the workflow synchronously or asynchronously, continuously and/or periodically.

The approach may be integrated with other enterprise- or network-based security methods and systems, such as in a SIEM, APT, graph-based cybersecurity analytics, or the like.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIG. 10 may vary depending on the implementation. Other internal hardware or peripheral devices, such as flash memory, equivalent non-volatile memory, or optical disk drives and the like, may be used in addition to or in place of the hardware depicted. Also, the processes of the illustrative embodiments may be applied to a multiprocessor data processing system, other than the SMP system mentioned previously, without departing from the spirit and scope of the disclosed subject matter.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 10) comprising hardware and software, and these entities communicate with one another over a network, such as the Internet, an intranet, an extranet, a private network, or any other communications medium or link.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the techniques described herein are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, execution threads, and the like.

The techniques herein provide for improvements to another technology or technical field, e.g., deep learning systems, real-world applications of deep learning models including, without limitation, medical classifications, other security systems, as well as improvements to deployed systems that use deep learning models to facilitate command and control operations with respect to those deployed systems.

As previously mentioned, the technique herein may be used in any domain and with any application wherein the neural network classifier may be subject to adversarial attack. The techniques described herein are not limited for use with any particular type of deep learning model. The approach may be extended to any machine learning model including, without limitation, a Support Vector Machine (SVM), a logistical regression (LR) model, and the like, that has internal processing states (namely, hidden weights), and the approach may also be extended to use with decision tree-based models.

Without intending to be limiting, the approach herein may be implemented within or in association with available solutions, e.g., IBM® Adversarial Robustness Toolbox (ART) v1.0, an open source Python library for machine learning (ML) security. This solution provides a unified, user-friendly environment to create robust and secure AI applications.

The robustness criterion is not limited to E, as the techniques herein may be used for any certification method including one that does not use E as the criterion.

The particular classification task that may be implemented is not intended to be limited. Representative classification tasks include, without limitation, image classification, text recognition, speech recognition, natural language processing, and many others.

Having described the subject matter, what we claim is as follows:

1. A method of training and using a machine learning model, comprising:
   obtaining class similarity data for a data set;
   receiving a set of robustness criteria for the data set, wherein the set of robustness criteria includes at least first and second robustness criterion that differ from one another, wherein the set of robustness criteria increases as the class similarity decreases;
   applying a smart label grouping algorithm to define the set of robustness criteria, wherein the smart label grouping algorithm uses a single classifier trained with a customized loss using an Inter-Group Robustness Prioritization (IGRP) scheme, wherein the customized loss comprises at least two types of relationships: an outer group loss and an inner group loss;
   clustering dissimilar class data into different class groups, wherein the outer group loss enforces a strict robustness criterion between the different class groups and clustering similar class data into a same class group, wherein the inner group loss enforces a loose robustness criterion between the same class group;
   training the machine learning model against the data set based on the class similarity data and the set of robustness criteria, wherein the trained machine learning model enforces multiple robustness criteria, and wherein during training, the outer group loss enforces the strict robustness criterion between different class groups by maximizing a distance between dissimilar classes, while the inner group loss enforces the loose robustness criterion between classes in the same group by minimizing the distance between similar classes; and
   using the trained machine learning model for a subsequent classification task.

2. The method as described in claim 1 wherein the first robustness criterion is less strict than the second robustness criterion.

3. The method as described in claim 2 wherein the first robustness criterion is applied between similar classes, and wherein the second robustness criterion is applied between dissimilar classes.

4. The method as described in claim 1 wherein the class similarity data is obtained by agglomerative clustering of last layer weights extracted from a base machine learning model trained with the data set.

5. The method as described in claim 2 wherein training the machine learning model includes dynamically applying the set of robustness criteria based on similarity of predicted classes.

6. The method as described in claim 5 further including applying a loss function that comprises an outer loss term, and an inner loss term, wherein the outer loss term enforces the second robustness criterion between dissimilar classes, and the inner loss term enforces the first robustness criterion between similar classes.

7. The method as described in claim 2 wherein training the machine learning model comprises building a hierarchical classifier with a tree structure having a plurality of nodes, wherein each node is a classifier over groups of classes.

8. The method as described in claim 7 further including training a classifier at one node with the first robustness criterion, and training a classifier at another node with the second robustness criterion.

9. The method as described in claim 7 wherein the tree structure is created from agglomerative clustering over a vector representation of classes.

10. An apparatus, comprising:
    a processor;
    computer memory holding computer program instructions executed by the processor to train and use a machine learning model, the computer program instructions configured to:
    obtain class similarity data for a data set;
    receive a set of robustness criteria for the data set, wherein the set of robustness criteria includes at least first and second robustness criterion that differ from one another, wherein the set of robustness criteria increases as the class similarity decreases;
    apply a smart label grouping algorithm to define the set of robustness criteria, wherein the smart label grouping algorithm uses a single classifier trained with a customized loss using an Inter-Group Robustness Prioritization (IGRP) scheme, wherein the customized loss comprises at least two types of relationships: an outer group loss and an inner group loss;
    cluster dissimilar class data into different class groups, wherein the outer group loss enforces a strict robustness criterion between the different class groups and cluster similar class data into a same class group, wherein the inner group loss enforces a loose robustness criterion between the same class group;
    train the machine learning model against the data set based on the class similarity data and the set of robustness criteria, wherein the trained machine learning model enforces multiple robustness criteria, and wherein during training, the outer group loss enforces the strict robustness criterion between different class groups by maximizing a distance between dissimilar classes, while the inner group loss enforces the loose robustness criterion between classes in the same group by minimizing the distance between similar classes; and use the trained machine learning model for a subsequent classification task.

11. The apparatus as described in claim 10 wherein the first robustness criterion is less strict than the second robustness criterion.

12. The apparatus as described in claim 11 wherein the first robustness criterion is applied between similar classes, and wherein the second robustness criterion is applied between dissimilar classes.

13. The apparatus as described in claim 10 wherein the computer program instructions configured to obtain the class similarity data includes computer program instructions configured to perform agglomerative clustering of last layer weights extracted from a base machine learning model trained with the data set.

14. The apparatus as described in claim 11 wherein the computer program instructions configured to train the machine learning model include computer program instructions further configured to dynamically apply the set of robustness criteria based on similarity of predicted classes.

15. The apparatus as described in claim 14 wherein the computer program instructions configured to dynamically apply the set of robustness criteria further include computer program instructions also configured to apply a loss function that comprises an outer loss term, and an inner loss term, wherein the outer loss term enforces the second robustness criterion between dissimilar classes, and the inner loss term enforces the first robustness criterion between similar classes.

16. The apparatus as described in claim 11 wherein the computer program instructions configured to train the machine learning model include computer program instructions further configured to build a hierarchical classifier with a tree structure having a plurality of nodes, wherein each node is a classifier over groups of classes.

17. The apparatus as described in claim 16 wherein the computer program instructions configured to build the hierarchical classifier further include computer program instructions also configured to train a classifier at one node with the first robustness criteria, and train a classifier at another node with the second robustness criterion.

18. The apparatus as described in claim 16 wherein the tree structure is created from agglomerative clustering over a vector representation of classes.

19. A computer program product in a non-transitory computer readable medium for use in a data processing system to train and use a machine learning model, the computer program product holding computer program instructions that, when executed by the data processing system, are configured to:

obtain class similarity data for a data set;

receive a set of robustness criteria for the data set, wherein the set of robustness criteria includes at least first and second robustness criterion that differ from one another, wherein the set of robustness criteria increases as the class similarity decreases;

apply a smart label grouping algorithm to define the set of robustness criteria, wherein the smart label grouping algorithm uses a single classifier trained with a customized loss using an Inter-Group Robustness Prioritization (IGRP) scheme, wherein the customized loss comprises at least two types of relationships: an outer group loss and an inner group loss;

cluster dissimilar class data into different class groups, wherein the outer group loss enforces a strict robustness criterion between the different class groups and cluster similar class data into a same class group, wherein the inner group loss enforces a loose robustness criterion between the same class group;

train the machine learning model against the data set based on the class similarity data and the set of robustness criteria, wherein the trained machine learning model enforces multiple robustness criteria, and wherein during training, the outer group loss enforces the strict robustness criterion between different class groups by maximizing a distance between dissimilar classes, while the inner group loss enforces the loose robustness criterion between classes in the same group by minimizing the distance between similar classes; and use the trained machine learning model for a subsequent classification task.

20. The computer program product as described in claim 19 wherein the first robustness criterion is less strict than the second robustness criterion.

21. The computer program product as described in claim 20 wherein the first robustness criterion is applied between similar classes, and wherein the second robustness criterion is applied between dissimilar classes.

22. The computer program product as described in claim 19 wherein the computer program instructions configured to obtain the class similarity data includes computer program instructions configured to perform agglomerative clustering of last layer weights extracted from a base machine learning model trained with the data set.

23. The computer program product as described in claim 20 wherein the computer program instructions configured to train the machine learning model include computer program instructions further configured to dynamically apply the set of robustness criteria based on similarity of predicted classes.

24. The computer program product as described in claim 23 wherein the computer program instructions configured to dynamically apply the set of robustness criteria further include computer program instructions also configured to apply a loss function that comprises an outer loss term, and an inner loss term, wherein the outer loss term enforces the second robustness criterion between dissimilar classes, and the inner loss term enforces the first robustness criterion between similar classes.

25. The computer program product as described in claim 20 wherein the computer program instructions configured to train the machine learning model include computer program instructions further configured to build a hierarchical classifier with a tree structure having a plurality of nodes, wherein each node is a classifier over groups of classes.

26. The computer program product as described in claim 25 wherein the computer program instructions configured to build the hierarchical classifier further include computer program instructions also configured to train a classifier at one node with the first robustness criterion, and train a classifier at another node with the second robustness criterion.

27. The computer program product as described in claim 25 wherein the tree structure is created from agglomerative clustering over a vector representation of classes.

28. A method for building a machine learning classifier that is adversarially robust, comprising:
- identifying inter-class relationships among a data set;
- applying a smart label grouping algorithm to define the set of robustness criteria, wherein the smart label grouping algorithm uses a single classifier trained with a customized loss using an Inter-Group Robustness Prioritization (IGRP) scheme, wherein the customized loss comprises at least two types of relationships: an outer group loss and an inner group loss;
- clustering dissimilar class data into different class groups, wherein the outer group loss enforces a strict robustness criterion between the different class groups and clustering similar class data into a same class group, wherein the inner group loss enforces a loose robustness criterion between the same class group;
- based on pairwise similarity data derived from the identified inter-class relationships, training the machine learning classifier such that robustness criterion for similar class pairs is less strict than the robustness criterion for dissimilar class pairs another, wherein the trained machine learning model enforces multiple robustness criteria, and wherein during training, the outer group loss enforces the strict robustness criterion between different class groups by maximizing a distance between dissimilar classes, while the inner group loss enforces the loose robustness criterion between classes in the same group by minimizing the distance between similar classes; and
- using the trained machine learning classifier to classify an input.

29. The method as described in claim 28 wherein training the machine learning classifier applies a grouping algorithm that is one of: a classifier trained with a custom loss function, and a neural decision tree with a set of mixed robustness classifiers.

\* \* \* \* \*